United States Patent [19]

Murray

[11] Patent Number: 4,888,912
[45] Date of Patent: Dec. 26, 1989

[54] NUTRIENT DEPLETING ENVELOPES CONTAINING AQUATIC PLANTS

[76] Inventor: David P. Murray, 853 Wiget La., Walnut Creek, Calif. 94598

[21] Appl. No.: 217,927

[22] Filed: Jul. 12, 1988

[51] Int. Cl.$^4$ .............................................. A01G 31/02
[52] U.S. Cl. .......................................... 47/1.4; 47/59
[58] Field of Search ....................................... 47/59, 1.4

[56] References Cited

U.S. PATENT DOCUMENTS

| | | | |
|---|---|---|---|
| 3,955,317 | 5/1976 | Gudin | 47/1.4 X |
| 4,169,050 | 9/1979 | Serfling | 47/1.4 X |
| 4,233,958 | 11/1980 | Heden | 47/1.4 X |
| 4,235,043 | 11/1980 | Harasawa | 47/1.4 |
| 4,487,588 | 12/1984 | Lewis et al. | 47/59 X |
| 4,536,988 | 8/1985 | Hogan | 47/59 X |
| 4,695,384 | 9/1987 | Ripl | 47/1.4 X |

FOREIGN PATENT DOCUMENTS 0105444  6/1985  Japan ................................. 47/1.4

Primary Examiner—Carl D. Friedman
Assistant Examiner—Jerrold D. Johnson
Attorney, Agent, or Firm—Townsend and Townsend

[57] ABSTRACT

A non-chemical method and system for depleting plant nutrient compounds in open bodies of water by cultivating aquatic plants in a container placed in the body of water. The container comprises an aquatic plant support, a phyto-compatible envelope surrounding the support surface and flotation means appended to the system for providing sufficient buoyancy to maintain the container within the photic zone. The system is not limited to any specific aquatic plant with the use of *Ceratophyllum demersum* being preferred for fresh water. The method and system are advantageous because they permit environmentally safe control of undesirable eutrophication of the water and prevent contamination of the system with the plant being used for depletion.

21 Claims, 1 Drawing Sheet

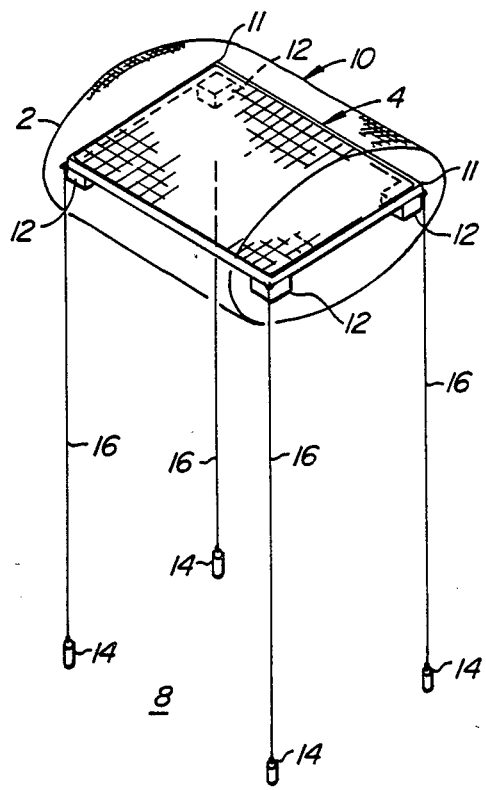
FIG._1
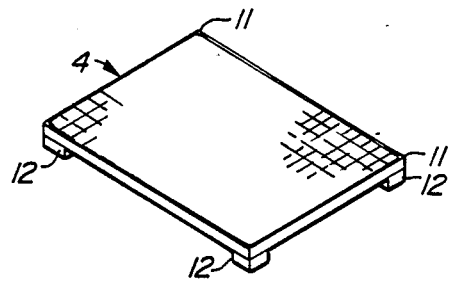
FIG._2.
FIG._3.

NUTRIENT DEPLETING ENVELOPES CONTAINING AQUATIC PLANTS

BACKGROUND OF THE INVENTION

A method and system for depleting plant nutrient compounds in open bodies of water by cultivating aquatic plants in a container placed in the body of water. The invention is directed primarily to maintaining high quality fresh water; however, the method and device described herein could be fashioned to effectively maintain other waters such as marsh water and sea water in its natural state.

The depletion of plant nutrients in a controlled fashion permits water quality to be maintained. Desired quality water standards are defined for lake water as potable water able to support sport fish and other organisms with relatively low amounts of aquatic plant growth. Maintenance of these parameters is dependent upon the control of bio-available nutrients that would otherwise support undesired plant growth.

The quality of lake waters is dependent on the availability and utilization of nutrient compounds such as nitrates and phosphates. If aquatic vegetation is allowed to become established, the absorption of nutrients by plant life strips these materials from the water. A satisfactory level of water quality is maintained so long as the population of aquatic plants is healthy and growth is controlled by a limited supply of nutrients. Where the nutrient levels are excessively high due to natural causes, man-made causes or both, the vegetation progressively continues to grow until the surface waters are covered, and thus the uses of the lake are reduced. Swimming and boating activities become limited.

Progressive vegetation leads to two repercussions. One, the aquatic plants will grow to the point that dissolved oxygen levels, just prior to sun up, will be below 4 ppm and the plants will begin to die. Two, the need to clear them from the surface will sponsor the use of herbicides.

In both cases, the same nutrients that these plants stripped from the water will now begin to reenter the water available for the remaining plants or, and much more likely, for algae.

The lake waters will now possess a new abundance of nutrient compounds. The availability of these nutrients will sponsor the growth of whatever aquatic plant or algae that can consume them most rapidly.

The species that will be capable of utilizing these nutrients most effectively are the phytoplanktons. These very small organisms are generally single cell or colonies of independent cells that can double their biomass in as little as 72 hours. Their populations are dense and of a nature that produces the "pea soup" appearance of a lake. They are capable of blocking light penetration and thus the death of all aquatic plants that existed prior to the algae bloom.

From this point forward, no large aquatic plants will survive and the dominant "pea soup" algaes will retain control of the ecosystem. The lake waters will no longer support anything more than minimal fish life. The potential recreational uses of the lake are reduced further from those available prior to the elimination of the large aquatic plants.

SUMMARY OF THE INVENTION

The present invention is directed to a environmentally safe, non-chemical method for depleting plant nutrient compounds in open bodies of water by cultivating aquatic plants in a system for containing and cultivating aquatic plants. The system comprises an aquatic plant support, a phyto-compatible envelope surrounding the support surface and flotation means appended to the device for providing sufficient buoyancy to maintain the container within a photic zone of the water. The device is not limited to any specific aquatic plant with the use of Ceratophyllum demersum being preferred. The advantage of the method is that nutrient depletion will control undesirable eutrophication of the water and prevent contamination of the system with the plant being used for depletion.

By following the described methods and using the devices disclosed herein, one can effect positive control over the rate of growth of aquatic plant life. Positive control is effected by a reduction of plant nutrients through a controlled aquatic population capable of consuming nutrients adequately enough to prevent the growth of phytoplankton algaes, but without allowing the controlled aquatic population from overtaking the lake waters and start the cycle over again.

Other features and advantages of the invention will appear from the following description in which the preferred embodiment has been set forth in detail in conjunction with the accompanying drawing.

BRIEF DESCRIPTION OF THE DRAWING

FIG. 1 is an overall view of the container made according to the invention.

FIG. 2 is overhead view of the plant support grate with flotation means attached to each corner 11.

FIG. 3 is an illustration of Ceratophyllum demersum.

DETAILED DESCRIPTION OF THE PREFERRED EMBODIMENTS

This invention provides for an aquatic plant support system for cultivating aquatic plants.

Referring now to FIG. 1, the system 2 includes an aquatic plant support 4 of plastic grated material which is capable of maintaining a plant 6 in position to maximize exposure to the sunlight in water 8. The aquatic plant support 4 may be solid instead of grated and is preferably made of light weight and rot resistant material such as plastic.

The plant support 4 is surrounded by a phytocompatible envelope 10 of plastic mesh such as is commercially available from TWP Co. of Berkeley, Calif. 94710 (polyethylene plastic netting). The phyto-compatible envelope 10 must be permeable to light, air and water. Specifically the envelope 10 should permit adequate light to reach the plant inside and permit fluid communication with the lake to allow for adequate growth of the plant inside. The envelope is preferably a transparent plastic mesh that has a netting size sufficient to contain the reproductive or propagative parts of the plant material therein. In the preferred embodiment the overall envelope is in a pillow shape around the plant support. However the mesh need not enclose the entire support so long as the plant is fully contained within the envelope. For example, a tent like enclosure domed over the plant support would represent an operable alternative for use in this invention.

System 2 must have an overall buoyancy that permits the device to position the plants within the photic zone. The photic zone is that region of the lake water that is sufficiently transparent to sunlight that maximal growth of aquatic plants will occur. To achieve this, floats 12 are attached to system 2.

The floats 12 are not limited to the foam elements of the preferred embodiment described as system 2. Suitable means include materials or devices having a specific gravity below 1.0 and include hollow devices and closed cell foam, e.g. styrofoam. The illustrated floats could be replaced by any means for maintaining the system 2 within the photic zone. Depending upon the specific gravity of the material, the plant support 4 and envelope 10, floats may be replaced with materials having a specific gravity in excess of 1.0.

In lieu of floats 12 and weights 14, system 2 could be suspended externally from a stationary point above the water. Flotation means can be attached either directly to support 4 as in the preferred embodiment or indirectly through a line tied to any point of the support. It is preferred that the floats are attached to the plant support but designs in which the flotation means are attached to the envelope should be readily apparent to those of skill.

System 2 also includes four weights 14 suspended from each corner 11 of the floats 12 by lines 16 to secure system 2 from being horizontally free floating about water 8.

System 2 can be designed as either a free floating container or preferably as a container secured to a single situs in the body of water. Means for securing or retaining system 2 are not limited to the arrangement of weights 14 and lines 16 offeed in FIG. 1. Optional securing means can be attached to either the envelope, flotation means or plant support and are preferably a line for tying the container to a stationary point or to an anchor of material with a specific gravity in substantial excess of 1.0 such as stainless steel. Toxic heavy metals such as lead are not preferred but are functional equivalents for weights. In the preferred embodiment non-degradable nylon or plastic lines 16 secure the device to a multiplicity of anchors. By varying the length of the lines 16, one can use the device in a variety of water depths while retaining the necessary position of the envelope within the photic zone.

Plants 6 useful for nutrient absorption are numerous and specific choices of species will depend upon the lake conditions. Rootless plant species are preferred because the uptake from the water is typically faster for such plants than for rooting aquatic plants such as hyacinth. More preferred are rootless aquatic plant species with large propagating material such that escape of propagation material is minimized. Preferred *genera* are *Ceratophyllum sps.* and preferred species are *C. demersum* and *C. echinatum*. *C. demersum* is rootless, will grow under a wide variety of conditions and has propagating buds of various sizes but none are smaller than about 1/16th of an inch. The envelope mesh size must be sufficiently small to contain the buds of demersum or other plant selected for use in this device.

The following example is provided for general illustration and not by way of limitation. Those of skill will readily perceive variations needed to optimize the described invention for different lake, pond and other water body conditions.

To estimate the quantity of Ceratophyllum needed to control aquatic plant life, one would use the following approach. If under a given set of conditions a phytoplankton algal species can double their biomass in 72 hours and Ceratophyllum, under the same conditions can double its biomass in 15 days, then an adequate quantity of Ceratophyllum must exist so that in 72 hours its increased biomass will be greater than that capable of being produced by a doubling of the existing phytoplankton biomass.

This relationship is important only for a brief period initially and, thereafter, only when a nutrient slug is inadvertently allowed to enter the water.

The initial process of introduction of the envelopes involves placing a minimal number in a lake infested with planktonic algaes. Secchi Disk readings a device used to determine visible light penetration are taken. If the Secchi disk reading is 2 feet, then the envelopes are placed no lower than 2 feet from the surface of the lake waters.

In addition, the $PO_4$-P levels are monitored for any major fluctuations, as are $NO_3$-N. Phosphate and nitrate assay tests are commercially available from numerous sources. The preferred assay methods are based upon those provided for in the current "Standard Methods," a publication available from the American Publ. Health Association, 1015 18th St., N.W., Washington, D.C.

The Ceratophyllum is allowed to grow at its maximum rate consuming all available nutrient compounds. The decrease in planktonic algal species growth is monitored by use of a Chlorophyll "A" test (see "Standard Methods") that measures indirectly the concentration of phytoplankton populations. The Ceratophyllum population or the number of envelopes is increased to accelerate the drop or decelerate the drop in the Chlorophyll "A" concentrations. In addition, the changes in $PO_4$-P and $NO_3$-N are also monitored to determine if influxes of nutrient compounds are influencing the population of phytoplankton.

The rate of growth of Ceratophyllum eventually matches any potential growth rates of phytoplankton. Blooms are no longer possible and the goal is now simply to drop nutrient concentrations to the point of virtual elimination of phytoplankton above that needed to maintain adequate zooplankton populations.

The size of the envelope varies according to the size of the lake and the economics of scale. In large lakes, the envelope size may be dictated by the ease of transportation. For ease of handling and for use in small ponds, a preferred envelope size is about 24 inches by 30 inches. For large lakes, the size of a envelope could be about 8 feet by 10 feet or larger such that flat bed trucks and cranes to off-load the envelope into a lake would be needed to handle the systems.

Maintenance procedures, from that point forward, are simply to adequately monitor the nutrient concentrations in lake waters and eliminate any source of sudden nutrient spikes.

The envelopes are routinely brought to the surface, checked for available space and area for growth. Once full, they are harvested or replaced with another envelope with abundant available material.

Modification and variation of the disclosed embodiment can be achieved without departing from the subject of the invention as defined by the following claims.

What is claimed is:

1. A method for depleting plant nutrient compounds in open bodies of water by cultivating an aquatic plant inside a water, air and light permeable envelope placed in the body of water, said envelope fully containing the plant such that the plant cannot escape into the body of water.

2. The method of claim 1 wherein the step of cultivating includes the selection of a rootless aquatic plant.

3. The method of claim 1 wherein the water is fresh water and the step of cultivating an aquatic plant includes the selection of a plant adapted to growth in fresh water.

4. The method of claim 3 wherein the aquatic plants are selected from the group consisting of *Ceratophyllum sps.*

5. The method of claim 4 wherein the aquatic plants are selected from the group consisting of *Ceratophyllum demersum* and *Ceratophyllum echinatum.*

6. The method of claim 5 wherein the aquatic plant is *Ceratophyllum demersum.*

7. The method of claim 1 further comprising the step of selecting a container adapted to prevent reproductive material of the plant from escaping the container.

8. A system for cultivating an aquatic plant within the photic zone of a body of water so as to deplete the water of plant nutrient compounds comprising:
   an aquatic plant support for supporting the aquatic plant;
   a phyto-compatible water, air and light permeable envelope surrounding the support surface and aquatic plant, said envelope fully containing the plant such that the plant cannot escape into the body of water; and
   means for maintaining the envelope and support therein within the photic zone.

9. A system of claim 8 having means for retaining the entire system to a selected location in the body of water.

10. A system of claim 9 wherein the securing means comprise weights attached to the system by depth adjustable fasteners.

11. A system of claim 8 wherein the phytocompatible envelope includes a light transparent, air permeable and fluid permeable material.

12. A system of claim 11 wherein the envelope includes a plastic net.

13. A system of claim 8 wherein the support includes a rigid grating platform.

14. The system of claim 13 wherein the grating has a grid pattern of about 1 inch.

15. A system of claim 8 wherein the means for maintaining the envelope and support therein within the photic zone comprise flotation means appended to the system for providing sufficient buoyancy to maintain the system within the photic zone.

16. A system of claim 15 wherein the floatation means have a specific gravity below 1.0.

17. A system of claim 16 wherein the floatation means include of foam floats having closed cells.

18. A system for depleting plant nutrient compounds in a open body of fresh water comprising:
   an aquatic plant;
   a envelope for containing the aquatic plant, said envelope permitting exchange of water and passage of light sufficient to support the growth of the plant, said envelope fully containing the plant such that the plant cannot escape into the body of water;
   a plant growth support structure contained within the envelope; and
   floats attached to the system so as to suspend the envelope within a photo zone of the body of water.

19. A system of claim 18 wherein the envelope is comprised of a mesh capable of retaining the propagating material of the plant.

20. A system of claim 18, wherein the plant is *Ceratophyllum demersum*, the envelope comprises a pillow-shaped enclosure of clear plastic mesh, the support structure comprises a rigid plastic grate having a grid pattern of about 1 inch, the floats comprise styrofoam and the system further includes at least one securing weight attached to the system by a length of rope.

21. A method for depleting plant nutrient compounds in a body of water comprising the following steps:
   selecting a water, air and light permeable envelope adapted to fully contain an aquatic plant to prevent the aquatic plant from escaping from the envelope; and
   placing the envelope and fully contained aquatic plant therein into the body of water, whereby the aquatic plant can grow and deplete the plant nutrient compounds from the body of water while fully contained within the envelope.

* * * * *